3,149,156
BROMINATION OF SALICYLANILIDE
Theodore E. Majewski, Midland, Mich., assignor to The Dow Chemical Company, Midland, Mich., a corporation of Delaware
No Drawing. Filed Mar. 5, 1962, Ser. No. 177,187
7 Claims. (Cl. 260—559)

This invention relates to a novel process for the bromination of salicylanilide. More particularly, this invention involves the bromination of salicylanilide in a chlorinated hydrocarbon medium to produce a mixture rich in 4′,5-dibromosalicylanilide.

A number of methods have been proposed for the bromination of salicylanilide. Some common reaction media used in these methods are alcohol, water, and mixtures thereof. The use of such reaction media usually results in a product mixture low in 4′,5-dibromosalicylanilide content and high in other bromination products of salicylanilide. In most of these methods the sought result is 3,4′,5-tribromosalicylanilide, either in pure form or as a substantial proportion of the product mixture.

It is generally thought that it is considerably less difficult to brominate dibromosalicylanilide to tribromosalicylanilide than to brominate salicylanilide to dibromosalicylanilide. For this and other reasons, it was unexpected that use of a reaction medium containing a chlorinated hydrocarbon would substantially hold the bromination reaction at dibromosalicylanilide. It was further unexpected that the predominant dibromosalicylanilide in the product mixture would be the 4′,5-dibromosalicylanilide isomer.

The method of this invention may be accomplished by mixing salicylanilide with a chlorinated hydrocarbon to form a slurry and brominating with bromine. The presence of water in excess of 20 percent of the reaction medium usually results in a product undesirably low in 4′,5-dibromosalicylanilide content. To the slurry is added bromine in the desired amount. The reaction mixture thus formed is then heated to the desired reaction temperature, such temperature being maintained until the reaction is substantially complete. Optionally, the reaction may be carried out in two or more steps, as by heating the reaction mixture to a desired temperature for a period of time, then raising or lowering the temperature, as desired, for a further period of time. When the reaction is substantially complete, the mixture is cooled, and the product mixture of brominated salicylanilide is removed from the reaction medium as by filtering. The product may then be washed and dried, if desired.

Chlorinated hydrocarbons appropriate for use as reaction media in the process of the present invention are those which contain at least one but no more than two carbon atoms, at least two chlorine atoms, and have a molecular weight greater than 90 and less than 170. Chloroform, ethylene dichloride, methyl chloroform, perchloroethylene, trichloroethylene, 1,1,2-trichloroethane and mixtures thereof are typical examples of such chlorinated hydrocarbons.

Reaction temperatures at which the process of this invention is operable may range from about 50 to about 80 degrees centigrade. Appropriate reaction time may be from about one hour to about three hours.

For best results, reactants are preferably added in a ratio of about two moles of bromine per mole of salicylanilide. Ratios of from about one mole of bromine per mole of salicylanilide to about three moles of bromine per mole of salicylanilide may be used.

Enough reaction medium is used to form a slurry with the starting salicylanilide. Generally from about one to about twelve volumes of reaction medium per unit volume of total reactant material may be used. Washing of the reaction product, if desired, may be accomplished by use of portions of the pure reaction medium. Drying may be carried out at slightly elevated temperatures.

The product mixture of the process of the present invention usually contains 4′,5-dibromosalicylanilide as the predominant constituent. Unreacted salicylanilide is usually removed in the washing step, but trace amounts may be present in the final product mixture.

Mixtures produced by the process of this invention are useful because of their combined bacteriostatic properties and low oral toxicity when compared with mixtures containing predominant amounts of 3,4′,5-tribromosalicylanilide. If desired, the product mixtures of this invention may also be used as sources of pure 4′,5-dibromosalicylanilide.

The process of the present invention may be more easily understood in light of the following examples which are set forth to illustrate, and are not to be construed to limit, this invention.

*Example 1*

A slurry was prepared by adding 0.4 mole of salicylanilide to 450 milliliters of ethylene dichloride. At a slurry temperature of about 55 degrees centigrade, 0.82 mole of bromine was added thereto. After addition of the bromine to the slurry, the temperature of the thus formed reaction mixture was maintained at about 55 degrees centigrade for one hour. At the end of this time, the temperature of the reaction mixture was raised over a one hour period to about 70 degrees centigrade. During this time, HBr and unreacted bromine were evolved. The mixture was then cooled with considerable refluxing to 25 degrees centigrade and filtered. The solids left after filtration were then washed three times with 50 milliliter portions of ethylene dichloride, slurried with a 200 milliliter portion of 1 percent sodium bisulfide solution and finally washed six times with 100 milliliter portions of water. After washing, the solid product was dried at 65 degrees centigrade. A yield of 91.5 percent was obtained, the product having the following analysis:

|  | Percent |
|---|---|
| 4′,5-dibromosalicylanilide | 56.3 |
| 5-bromosalicylanilide | 19.3 |
| 3,5-dibromosalicylanilide, 3,4′,5-tribromosalicylanilide | 24.1 |
| Salicylanilide | 0.3 |

Using substantially the same procedure as above, but varying the amount of bromine added to the ethylene dichloride-salicylanilide slurry, the following product mixtures were obtained. Using 0.7 mole of bromine per 0.4 mole of salicylanilide:

|  | Percent |
|---|---|
| 4′,5-dibromosalicylanilide | 39.2 |
| 5-bromosalicylanilide | 39.0 |
| 3,5-dibromosalicylanilide, 3,4′,5 - tribromosalicylanilide | 20.2 |
| Salicylanilide | 1.6 |

Using 1.0 mole of bromine per 0.4 mole of salicylanilide:

|  | Percent |
|---|---|
| 4′,5-dibromosalicylanilide | 62.3 |
| 5-bromosalicylanilide | 6.1 |
| 3,5-dibromosalicylanilide, 3,4′,5 - tribromosalicylanilide | 31.6 |

*Example 2*

A slurry was prepared by adding 0.4 mole of salicylanilide to a mixture of 101 milliliters of water and 400 milliliters of 1,1,1-trichloroethane. At a slurry temperature of 60 degrees centigrade, 0.82 mole of bromine was added thereto. After addition of the bromine to the slurry, the temperature of the thus formed reaction mixture was maintained at from about 50 to about 60 degrees centigrade for about three hours. At the end of this time, the mixture was cooled to 25 degrees centigrade and filtered. The solids left after filtration were then washed three times with 100 milliliter portions of 1,1,1-trichloroethane and six times with 100 milliliter portions of water. After washing, the solid product was dried at 65 degrees centigrade. A yield of 87.4 percent was obtained, the product having the following analysis:

| | Percent |
|---|---|
| 4',5-dibromosalicylanilide | 36.7 |
| 5-bromosalicylanilide | 22.3 |
| 3,5-dibromosalicylanilide, 3,4',5 - tribromosalicylanilide | 38.9 |
| Salicylanilide | 2.1 |

*Example 3*

Using substantially the same procedure shown in previous Examples 1 and 2, salicylanilide may be brominated in reaction media having a maximum of 20 percent water and containing chloroform, methyl chloroform, perchloroethylene, 1,1,2-trichloroethane or mixtures thereof to give a product mixture in which the predominant single component is 4',5-dibromosalicylanilide.

Various modifications may be made in the present invention without departing from the spirit or scope thereof, and it is to be understood that I limit myself only as defined in the appended claims.

I claim:

1. In a method of producing a mixture of bromination products of salicylanilide rich in 4',5-dibromosalicylanilide wherein salicylanilide is contacted with bromine in a reaction medium whereby bromination is accomplished, the improvement which comprises providing as the reaction medium a mixture of (A) a maximum of 20 percent water, and (B) a chlorinated hydrocarbon having at least one and a maximum of two carbon atoms, at least two chlorine atoms, and a molecular weight greater than ninety and less than one hundred seventy.

2. In a method of producing a mixture of bromination products of salicylanilide rich in 4',5-dibromosalicylanilide wherein salicylanilide is contacted with bromine in a reaction medium whereby bromination is accomplished, the improvement which comprises providing as the reaction medium a mixture of (A) a maximum of 20 percent water and (B) chloroform.

3. In a method of producing a mixture of bromination products of salicylanilide rich in 4',5-dibromosalicylanilide wherein salicylanilide is contacted with bromine in a reaction medium whereby bromination is accomplished, the improvement which comprises providing as the reaction medium a mixture of (A) a maximum of 20 percent water and (B) ethylene dichloride.

4. In a method of producing a mixture of bromination products of salicylanilide rich in 4',5-dibromosalicylanilide wherein salicylanilide is contacted with bromine in a reaction medium whereby bromination is accomplished, the improvement which comprises providing as the reaction medium a mixture of (A) a maximum of 20 percent water and (B) methyl chloroform.

5. In a method of producing a mixture of bromination products of salicylanilide rich in 4',5-dibromosalicylanilide wherein salicylanilide is contacted with bromine in a reaction medium whereby bromination is accomplished, the improvement which comprises providing as the reaction medium a mixture of (A) a maximum of 20 percent water and (B) perchloroethylene.

6. In a method of producing a mixture of bromination products of salicylanilide rich in 4',5-dibromosalicylanilide wherein salicylanilide is contacted with bromine in a reaction medium whereby bromination is accomplished, the improvement which comprises providing as the reaction medium a mixture of (A) a maximum of 20 percent water and (B) trichloroethylene.

7. In a method of producing a mixture of bromination products of salicylanilide rich in 4',5-dibromosalicylanilide wherein salicylanilide is contacted with bromine in a reaction medium whereby bromination is accomplished, the improvement which comprises providing as the reaction medium a mixture of (A) a maximum of 20 percent water and (B) 1,1,2-trichloro ethane.

References Cited in the file of this patent

UNITED STATES PATENTS

| 2,802,029 | Schuler | Aug. 6, 1957 |
| 2,967,885 | Lamberti | Jan. 10, 1961 |
| 2,997,502 | Mattson | Aug. 22, 1961 |

FOREIGN PATENTS

| 840,366 | Great Britain | July 6, 1960 |

OTHER REFERENCES

MacArdle: The Use of Solvents, pages 3 and 133 (1925). QD 281 S8 M3.